US008583031B2

(12) United States Patent
Rao

(10) Patent No.: US 8,583,031 B2
(45) Date of Patent: Nov. 12, 2013

(54) MOBILE DEVICE AND DISTRIBUTION SERVER FOR REVIEW OF NEWLY CREATED MUSIC BY FANS

(76) Inventor: Bindu Rama Rao, Laguna Niguel, CA (US)

( * ) Notice: Subject to any disclaimer, the term of this patent is extended or adjusted under 35 U.S.C. 154(b) by 509 days.

(21) Appl. No.: 11/982,560

(22) Filed: Nov. 1, 2007

(65) Prior Publication Data

US 2009/0117845 A1    May 7, 2009

(51) Int. Cl.
*H04M 3/42* (2006.01)
*H04H 60/21* (2008.01)
*G06Q 20/00* (2012.01)

(52) U.S. Cl.
USPC ....... 455/3.05; 455/410; 455/411; 455/414.1; 709/230; 709/236; 709/203; 709/216; 709/217; 709/218; 709/219; 705/64; 705/67; 705/72; 705/73; 705/75; 705/76; 705/77; 705/78

(58) Field of Classification Search
USPC .............. 455/3.05, 410, 411, 414.1; 709/230, 709/236, 203, 216–219; 705/64, 67, 72, 73, 705/75–78
See application file for complete search history.

(56) References Cited

U.S. PATENT DOCUMENTS

| | | | |
|---|---|---|---|
| 6,317,784 B1 * | 11/2001 | Mackintosh et al. | 709/219 |
| 6,490,508 B2 * | 12/2002 | Maruyama et al. | 701/1 |
| 7,194,520 B1 * | 3/2007 | Beard et al. | 709/217 |
| 7,301,939 B2 * | 11/2007 | Boys | 370/353 |
| 7,444,353 B1 * | 10/2008 | Chen et al. | 1/1 |
| 7,493,647 B2 * | 2/2009 | White et al. | 725/87 |
| 7,496,669 B2 * | 2/2009 | Hirayama | 709/229 |
| 7,506,019 B2 * | 3/2009 | Stern et al. | 709/200 |
| 7,583,928 B2 * | 9/2009 | Iwatsu et al. | 455/3.01 |
| 7,653,737 B2 * | 1/2010 | Colbath | 709/231 |
| 2002/0112597 A1 * | 8/2002 | Shibata et al. | 84/609 |
| 2006/0239131 A1 * | 10/2006 | Nathan et al. | 369/30.06 |
| 2006/0253585 A1 * | 11/2006 | Fein et al. | 709/225 |
| 2007/0243509 A1 * | 10/2007 | Stiebel | 434/236 |
| 2008/0167016 A1 * | 7/2008 | Swanburg et al. | 455/414.1 |
| 2010/0274661 A1 * | 10/2010 | Aaltonen et al. | 705/14.42 |
| 2011/0066943 A1 * | 3/2011 | Brillon et al. | 715/716 |

* cited by examiner

*Primary Examiner* — Bobbak Safaipour

(57) ABSTRACT

An artist or a music company creates multimedia music contents using interactive media creating tools on their computer and upload to a fans club server. The fans club server maintains all fans registration information and client uploaded multimedia music/songs contents. An interactive media description module on the fans club server generates the interactive media using the multimedia contents provided by the client or the artist as its input. The generated interactive media will be distributed among the fans of the respective artist for playing on their mobile phones and review their contents online for a feedback before the songs being released in the market. The interactive media also prompts mobile phone user for purchasing the songs online. The mobile phone user can also purchase trial songs, and download on their mobile phone and make the online payment. The interactive media options also prompt user to make the trial songs as their mobile phone ringtone and also enable other mobile phone user to become a fan by a fresh registration when a fan forwards interactive media screen to him/her. Offline purchasing by sending bank cheque and its details is also facilitated in accordance with the present invention.

27 Claims, 10 Drawing Sheets

Prev. = Previous
CD = Compact Disk

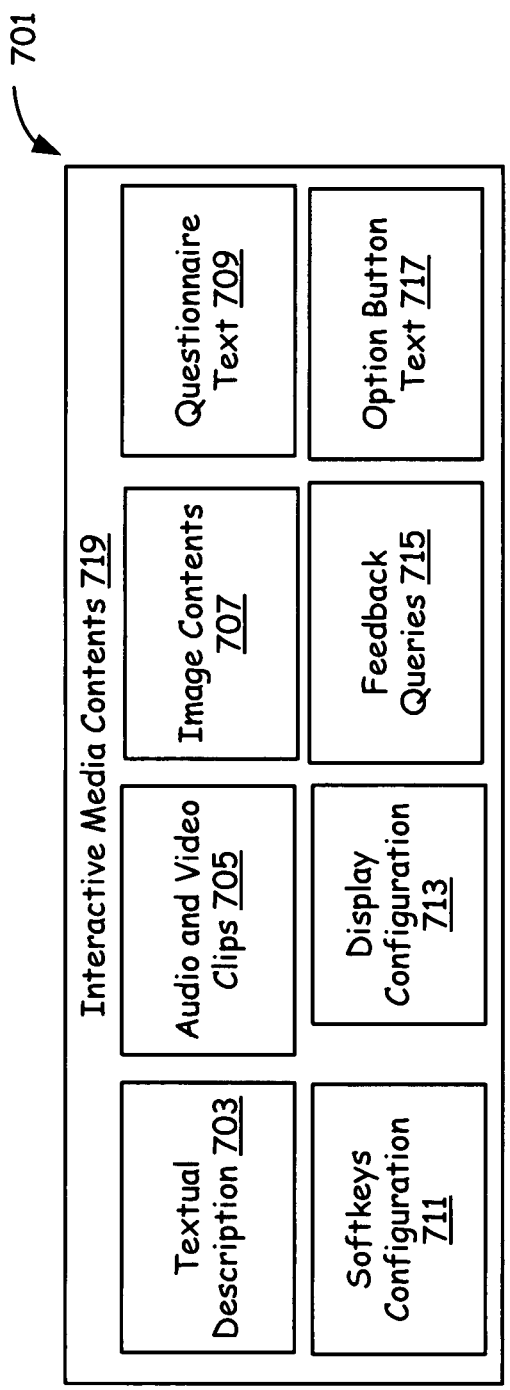

MOBILE DEVICE AND DISTRIBUTION SERVER FOR REVIEW OF NEWLY CREATED MUSIC BY FANS

CROSS REFERENCES TO RELATED APPLICATIONS

The present patent application makes reference to U.S. non-provisional patent Ser. No. 11/821,771, entitled "SYSTEM FOR PROVIDING INTERACTIVE USER INTEREST SURVEY TO USER OF MOBILE DEVICE", filed on Jun. 25, 2007. The complete subject matter of the above-referenced United States patent application is hereby incorporated herein by reference, in its entirety.

This patent application makes reference to U.S. provisional patent, Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States patent application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety

BACKGROUND

1. Technical Field

The present invention relates generally to the distribution of interactive media with musical content to a group of recipients on their mobile phones; and more particularly to a network where an artist distributes his creation to his fans for initial feedback prior to an official release of his creation into a market.

2. Related Art

Quite often when an artist creates a new art work and releases it into a market, the artist has very limited information on how successful it is likely to be in the market. Often a CD of music that is released into a market flops and goes into oblivion at great financial loss to the producers and to the artist. Currently there is no system that can help with reducing the risk involved in releasing a new artistic product, such as a new music created, a new set of photographs, or a new painting, into the market. There are really no simple means of gathering opinion on a newly created music before a CD/media is released, from a cross section of the market. If the buyers of the songs are not satisfied with the contents in a newly purchased CD/media, they lose money the spent in buying it. The dissatisfied buyers are likely to be "once bitten twice shy". This often leads to a loss of popularity for the artists who have contributed to the new CD and to the producers or the music company that markets them.

The manpower that is typically needed in the form of sales representatives or in the form of some focus groups to gather market opinion, or conduct trials is quite prohibitive in cost and is not very effective in predicting how successful the released content is actually going to be in the market. Inaccurate statistic gathered by salesmen or vendors during such a process will mislead the music company causing heavy losses. Misinterpreted market forecasts and some unforeseen market trends often lead to wrong marketing plans and hence loss to the producers or the company. Finally the whole process results in an unexpected outcome in the market and often the hard-earned reputation of the company and the artist is lost.

Current marketing strategy through the existing media outlets such as TV, internet, and other forms involve spending huge money for ads that promote a new product/CD/song that is released into the market. All of these techniques are uncertain in their outcomes as far the release of new CDs/songs is concerned and it difficult to really know the reception in the market in advance by the technique of advertisements on such media outlets. In such occasions it's very tough to make decision on in the volume of inventories that need to be created, and predictions of large demands of music/audio CDs released into the market often prove wrong. Once a new CD/DVD is released in large volumes, if buyers or the customers offer a poor response, or express a negative opinion, it could lead to recall of the CDs/DVD from the market, an extremely dangerous situation for the manufacturers and retailer as a lot of money may already have been spent.

Current methods/techniques of online marketing for entrainment-related media, such as music or audio CDs, are difficult, especially in reaching a common customer who does not have a PC or access to the Internet. Because online selling of such entrainment media is made easy through PCs/computers, at present marketing companies are focusing on Internet sales. However, a significant portion of the world population lack access to computers and the Internet, but are still an important segment of buyers of new CDs/DVDs, etc. The percentage of music listeners is much larger than the percentage of people who have access to PCs and the Internet, and generally they may not have access to computer. So there is a need to efficiently reach out to the larger population and provide them with information regarding new CD releases that hit the market.

The current methods of marketing and advertisements do not facilitate any means of information sharing by like minded individuals with and similar tastes and habits. There are limited means for such people to group together to share their views on a product, such as music, video, etc. Some web portals provide a web community for sharing such information. Again, a significant portion of the people of the world cannot participate in such web communities for several reasons.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 6 is a screen snapshot of the mobile phone during a purchase of songs or CDs by fans, in accordance with the present invention;

FIG. 7 is the block diagram showing the embedded components of an interactive media delivered to the mobile phones, in accordance with the present invention;

DETAILED DESCRIPTION OF THE DRAWINGS

Over a billion people in the world own and operate mobile devices, such as cellular phones, and this number is growing very fast. In the near future, every individual in the world is likely to own at least one mobile device. A mobile device and a mobile network are a very important communication means through which vital information reaches a large section of people, keeping them involved in interactions with other like-minded individuals and providing a means of sharing content. Aspects of sharing e-business data and interactive media is supported in the present invention, with particular support for sharing of newly created music and other forms of creative art by an artist with his fans worldwide. Specifically, part of the information that flows across wireless mobile network is content designed for mobile devices, with music and videos being among the most sought after content. The interactive media that can be shared by an artist with his fans, the sharing of which is described in the present invention, comprises multimedia music contents presented on the mobile phone to users (fans). In fact, the fans can receive and review newly created material before they are officially released into the market by the artist, in a preview or tails mode. Thus, an artist can send his fans a newly created art (such as music) for a trial run and have the fans review it and provide feedback on those contents prior to releasing the newly created content (such as songs) into the market.

Figure 1:
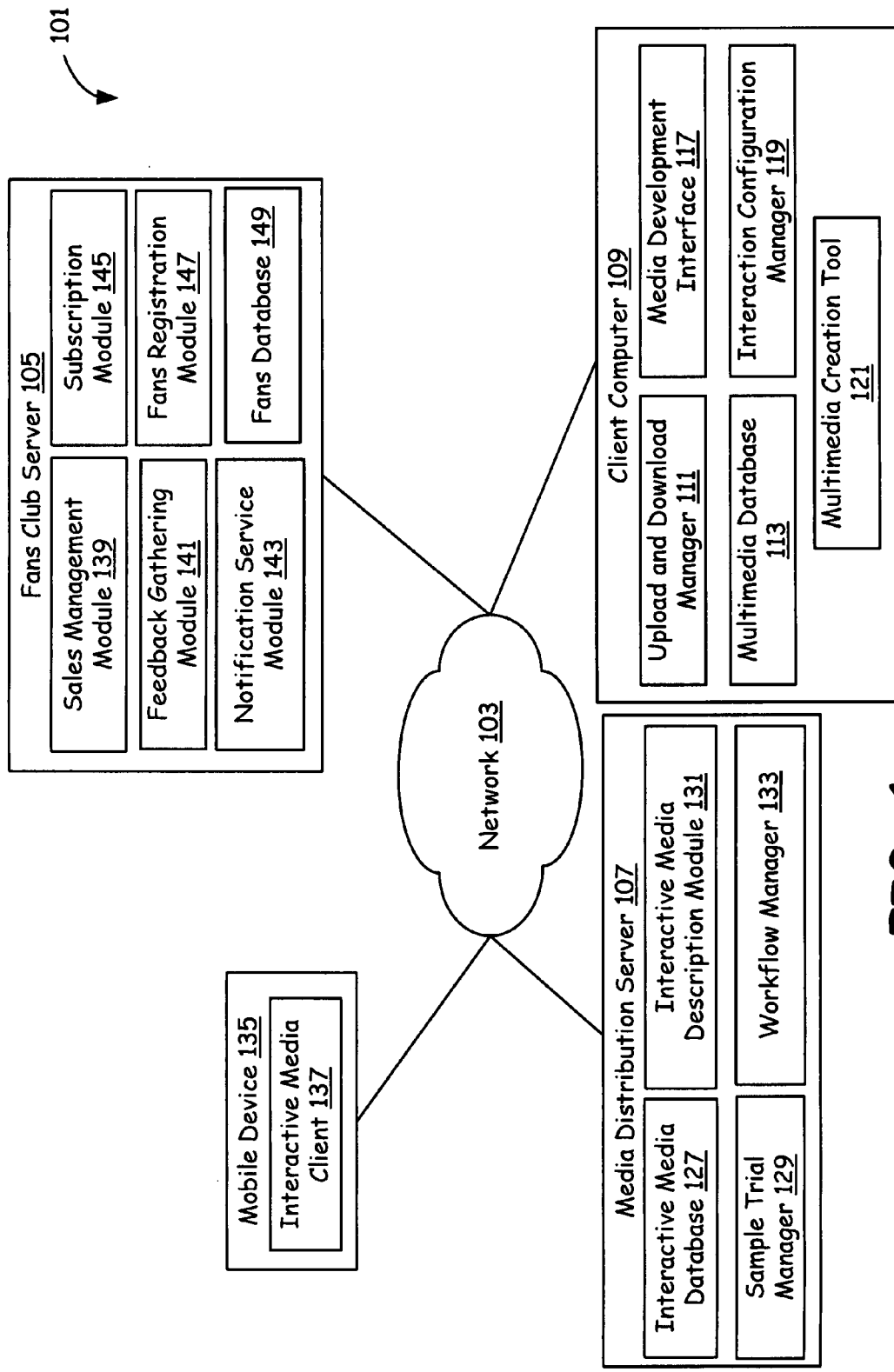
FIG. 1 is a perspective block diagram of a fan review system comprising a fan club server, a mobile device with an interactive media client, a media distribution server 107 and a client computer.

FIG. 1 is a perspective block diagram of a fan review system 101 comprising a fan club server 105, a mobile device 135 with an interactive media client 137, a media distribution server 107 and a client computer 109. An artist such as a musician makes new music (songs, etc.) and incorporates it into an interactive media using the client computer 109. The artist then uploads it to the media distribution server 107 for distribution to his fans. The fans register at the fan club server 105 to receive interactive media from the artist. The fans employ their mobile devices such as the mobile device 135 to receive, review and optionally purchase the new music.

The fan review system 101 supported by the present invention is a new concept involving distribution of qualifying multimedia products (often with music contents) to a select group of people (typically fans) onto their mobile devices 135, in accordance with present invention. The recipients who are part of the select group may belong to a "fan club" of an artist. A fan club is basically a registered group of members who follow the work of an artist and are keen to find out more about the artist's work and about new art being created or released by the artist. A member of a fan club of an artist or a singer can register online into a web community or fan club portal, and get an account on a server called a fans club server 105. After becoming a registered fan, a member gets access to newly created material of the artist, and can also subscribe to various additional services. A person can be a fan of more than one artist or singer, in accordance with the present invention.

In accordance with the present invention, a fan review system 101 comprises a means to distribute newly created music, artwork, etc. to registered fans of an artist, with distribution aimed at mobile devices of the fans. The fan review system 101 membership comprises a large number of fans who register their mobile devices 135 (such as mobile phones) to receive newly created music, etc. The fans club server 105 is used for registration by a fan. A client computer 109 is used by an artist to upload newly created music etc. to the media distribution server 107. Using the client computer 109 (such as a PC) an artist or a music company uploads songs, packaged as a multimedia content. In one embodiment according to the present invention the media distribution server 107 is integrated into the fans club server 105.

Songs from an artist, such as a singer, are uploaded in the form of multimedia with music content to the media distribution server (or in some embodiments, the fans club server 105), which generates an interactive media from the multimedia that can be delivered to fans mobile phones 135. Fans who receive the interactive media will open these songs and listen to them, and be able to provide feedback, and express their opinion to a questionnaire provided. A fans feedback is provided in the form of a multiple choice selections provided as a means to gather a fans response to each of the songs packaged in the interactive media. The multiple choice selections for each of the songs presented on the mobile phones are, for example, "Great", "Ok", "Don't Like", "Seen similar", "Purchase" from which a fan selects one employing an associated radio button.

An exemplary embodiment of the present invention comprises user selection of a new work-in-progress (from one or more artists) from a music library from a welcome screen on the mobile device. Once the artist is selected, submenus are presented for an artist with multiple projects or multiple work-in-progress CDs. With a plurality of projects/work-in-progress or with multiple CDs, a choice is presented to the user in the form of a list. Selecting a CD from this list for an artist opens a list of songs on a new screen. From the new screen an user/fan can select the songs to listen to and provide feedback, and indicate approval/disapproval. Multiple selections of the songs from different CDs can also be done and purchase a option is provided to the user/fan so that he can purchase a yet-to-be-released song. Thus a work-in-progress song/music can be selected for purchase by a user/fan, and when triggered, an invoice screen comprising a list of all the songs selected for purchase is presented with the purchase price showing for user approval.

From the invoice screen the user can further do price based selections and submit a final selection for purchase, which brings up a payment screen. From the payment screen an user can perform online payment to download the songs. Offline payment involves payment by bank cheque delivered to a prompted address. The user can also enter his/her contact address for receipt of a final released product for his selection/ purchase.

Typically a fan club client component in the mobile device 135 provides for such user interaction. Most of the screens provided and menu items presented to a user are data driven for the most part. In addition, a fan profile stored in a fan club server 105 can be used to guide user initiated transactions such as purchases.

In accordance with the present invention, a fans club server 105 provides support for management of the content flow to the mobile devices of fans who are members of a fan club. It provides online registration by a fan from a mobile phone 135, facilitates uploading multiple instances of a fan review from the mobile phone 135 of a fan, and the distribution of music/songs/multimedia created by a music company or an artist to the registered fans.

A content creation tool in the client computer 109 used by an artist or a music company helps create interactive media that is distributed to the fans, to solicit a fan review based on the distributed interactive media. It facilitates the upload of the interactive media comprising one or more created content such as songs, music, etc., to the media distribution server 107. The media distribution server 107 distributes the uploaded interactive media comprising the artists content to fans who have registered at the fan club server 105 to receive such content.

The interactive media (with songs, music, images, videos, etc.) can be forwarded to others by a recipient/fan. Also new recipients can register as a member to a fan club from their mobile phones or by using appropriate web pages provided by the fans club server, or a webserver associated with and communicatively coupled to the fan club server. The fans review system 101 also facilitates the mobile phone user's mobile purchases of songs/music/videos that are provided, or portions of which are provided, in the interactive media distributed to them. Thus fans can preview and optionally even purchase such new material created by their favorite artists before such new material is even released into the market. By purchasing those songs online using their mobile phones 135, he/she can play on his/her mobile phone and also make those songs as their ringtone by downloading, before the general public can buy it from the market.

The fans club server 105 provides several features including fan registration and account setup by a fan that can be used to purchase songs and ringtones, CDs, etc. 3. In addition, it enables an artist or a music company that creates interactive media with music contents to upload to them for distribution, such uploads ending up in the media distribution server 107. It also collates responses received from fans and optionally exports them into a spreadsheet. The collated responses can be viewed on the website or exported and downloaded as a spreadsheet.

The media distribution server 107 distributes interactive media using an interactive media distribution module. It sends a welcome message, a purchase option, an invoice data for review and payment details to the mobile phones 135 of the fans, facilitating the review of newly created content/ music/art by an artist and its optional purchase by the fan/ user.

The mobile devices 135 used by fans to receive and review interactive media comprise a client software that has several important features in accordance with the present invention. A fan/user can review new songs, videos, etc. and provide feedback to an artist or a music company. In one embodiment of the present invention, the interactive media is presented as a series of songs, each with an accompanying multiple choice selections (radio buttons for example) that can be used by a fan to provide feedback on individual songs. Thus an audio-assisted questionnaire format is employed with an audio component comprising a song/music, a textual component with some descriptions of the song/music, and a graphic image such as a picture of the artist. Such an interactive media in a questionnaire format (with songs/music embedded as audio components) enables preview by fans and the means to gather feedback from the fans (such as before the release of a CD or DVD into a market). The client also enables purchase of an item by a fan, from artist or music company, even before an official release of a corresponding CD or DVD. A user can provide feedback to artist or the music company and also be able to download one or more songs/music as a ringtone.

In general, the fans review system 101 is capable of qualifying music based on likes and dislikes by a group of fans of a respective artist. It maintains a list of genres that a user prefers. The fans review system 101 comprises the mobile phone 135 and the fans club server 105 communicatively coupled by a network 103. The fans club server 105 is also communicatively coupled to a client computer 109 and to a separate the media distribution server 107 via the network 103. In another embodiment of the present invention the media distribution server 107 is integrated into the fans club server 105 and it performs the function of interactive media distribution on the mobile phones 135.

The fans club server 105 comprises a sales management module 139, a feedback gathering module 141, A notification service module 143 and a subscription module 145, a fans registration module 147 and a fans database 149. The sales management module 139 tracks the sales performed by each fan in buying the songs or CDs released for evaluation from many artists or music companies. It also maintains the information on each registrant (fan) related to the purchase of songs and CDs during their trial or full volume release in the market.

The feedback gathering module 141 of the fans club server 105 gathers review information from the fan's mobile phone 135. Such feedback, in one embodiment, is collected by the media distribution server. In another embodiment, it is directly received from the mobile device 135. Fans review an interactive media comprising an artists creations, such as music/songs and other content, by selecting appropriate entries of a multiple choice questions provided, typically one per each song or item in the interactive media. Selections are made using a joystick and/or soft keys on the mobile device 135 by a user, and often clicking radio buttons on their mobile device 135 corresponding to a multi choice item of a question in a questionnaire, from the screen presented on the mobile device 135, results in providing feedback for an associated song or item. For example, the questionnaire comprising songs and feedback text may consist of a multiple choice set with selections such as "Great", "Ok", "Don't Like", "Seen similar", "Purchase" items for selection using the radio buttons. A user can select the choices presented in order to provide feedback on each of the songs contained in the questionnaire, thus evaluating each song from an artists new CD for example.

The notification service module 143 of the server 105 notifies each fan registered on the server 105 on the release of a new music CD from their favorite singer. Notification can be communicated by an SMS message sent to the mobile device 135, by an email sent to the fan/user's email address, and by other means. The subscription module 145 of the server 105 prompts each of the interactive media recipients to subscribe to new services, subscribe to become fan of other artists registered on the same fans club server 105, etc. Also this module enables management of subscriptions, management of payment options/preferences, adding additional recipients to a subscription, etc. The subscription module 145 keeps tracks of subscription details of each of the fans on the server 105.

The fan registration module 147 of the fan club server 105 receives all new fans' registration information from the mobile phone 135. The fans database 149 contains all the information on individual fans who have registered on the fan club server 105. The information on individual account includes the registration information, configuration profile information, subscription information, purchase information, etc.

The mobile phone 135 receives the interactive media information, and in some embodiment, interactive media in the form of the screens assembled and delivered from the server 105. It can also, in some embodiments, receives interactive media in the form of embedded messages, multimedia with music contents, program codes, etc. modules. It has interactive media client that runs from the mobile phone 135, that facilitates interactions with the media distribution server 107 and the display of interactive media for a user/fan.

In one embodiment of the present invention the fans review system has a separate media distribution server 107. The media distribution server 107 receives inputs pertaining to the generation of the interactive media from different service providers and interactive media recipients and generates the interactive media and delivers them to the fan's mobile phones 135. The required data for the various mobile display screens, for each product presentation such as music CDs and songs, are assembled and delivered to the mobile phone 135 by media distribution the server 107.

The media distribution server 107 comprises an interactive media database 127 that stores all the generated interactive media. The interactive media description module 131 receives inputs from the product or service companies and the mobile phone users and generates new interactive media, assembling various components and inserting advertisements and other content as necessary. A sample and trial manger 129 of the server 107 facilitates trials of the music CDs. A workflow manger 133 facilitates the interactions between the mobile device 135, the fan club server 105 and the media distribution server 107. For example, it manages message and the control information flow between the mobile phone 135 and the media distribution server 107.

The client computer 109 is the artist or the music company's computer from which the interactive media (typically multimedia with audio, graphic, video and textual components combined with multiple choice selections, etc.) with the music contents are created and uploaded to the media distribution server 107. The client computer 109 has an upload and download manager 111 which facilitates the uploading of the interactive media and the downloading of the fan's reviews/reports/etc. The upload and download manager 111 also supports download of sales related information from the fan club server 105. A multimedia database 113 has all the music content multimedia that are created in the client computer 109.

A media development interface 117 of the client computer 109 facilitates the creation and assembly of the various components, such as the creation of new audio components or the assembly of graphics and video components, of an interactive media created by an artist (singer, musician, etc.) or an employee of a music production company (for example). An interaction configuration manger 119 of the client computer 109 facilitates setting up of the preferences and usage profiles for the interactive media. Several different parameters can be configured, such as the order in which different components can be played, the type of multiple choice selections, whether they are exclusive or allow for multiple selections, etc. In addition, other preferences/client side behavior can be configured such as the playing of an audio or the starting of a video as soon as a new item (or next item) is activated in the mobile device as opposed to the playing of an audio or the stating of a video upon an explicit user request/trigger. The multimedia creation tool 121 comprises all the applications that are used during the creation of the music/songs or a video. It makes it possible to create new content, edit them, assemble them into an interactive media, and incorporate new/additional content into an existing interactive media. It also facilitates creating different versions of an interactive media, such as those for different languages or those for different distributions points of locations, and in managing them.

The mobile device 135 displays personalized and interactive advertisements encountered in the interactive media. It facilitates forwarding by the user the interactive advertisements to another mobile device. The mobile device receives and stores a personalized and interactive advertisement in the mobile device on user selection and user action. In one embodiment, the mobile device displays the personalized and interactive advertisement before displaying an interactive media received from the distribution server. In one embodiment, the mobile device retrieves an interactive media from the distribution server and receives the interactive media along with an accompanying personalized and interactive advertisement.

In one embodiment, the mobile device displays the accompanying personalized and interactive advertisement before, during or after the display of the interactive media based on a configuration information provided by the distribution server. In a different embodiment, the mobile device of plays the interactive media wherein it is an interactive mobile advertising content comprising at least one audio-assisted mobile advertisement.

Figure 2:
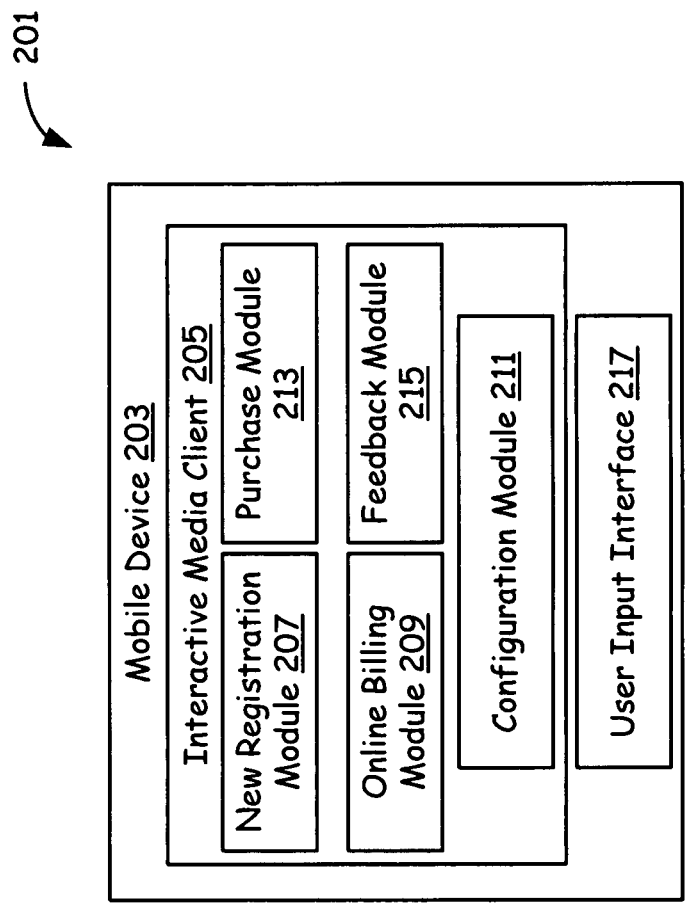
FIG. 2 is a block diagram of the mobile device showing the interactive media client components for supporting the display of interactive media comprising new artist creations such as music, videos and songs, for review and feedback by a user, in accordance with the present invention.

FIG. 2 is a block diagram of the mobile device 203 showing the interactive media client components for supporting the display of interactive media comprising new artist creations such as music, videos and songs, for review and feedback by a user, in accordance with the present invention. The mobile device 203 (similar to the device 135 of FIG. 1 repeated) does not perform computationally intensive operation by itself. Running long video clips at the required frame rates may not be possible on all the mobile phones in general. Most of the operations such as transcoding videos and making multimedia components compatible with a mobile device capabilities are performed on the media distribution server and are communicated to the mobile device 203 which, in one embodiment, picks frames or screens from the cache and plays them. Cache works like a stack freeing up the played frames bytes for the incoming frames or screens.

Some of the essential operations are performed on the mobile device 203 itself. Performing the registration, online billing and communicating with the media distribution server, gathering user interaction data with the interactive media are managed by the interactive media client 205. User interaction data comprises user review information, purchase related processing information, user's request for a ringtone made from a current song being played on the mobile device, user's request for a download of a graphic shown on the device, etc. are all performed on the mobile device and communicated to a, such as the fan club server 105, in some deployments via a media distribution server 107. The interactive media configuration setting can also be performed on the mobile device 203. Some of these components of the interactive media client are downloaded from a server, such as the fan club server 105, online and installed on the mobile device 203. Others may be embedded in a device or provided as part of an pre-installed software.

The interactive media client 205 is typically a downloadable client, although pre-installed versions are contemplated. It comprises several client components including a new registration module 207 which is used to setup the required protocol and provides the necessary interface for the user to create a new registration on the fans club server 105 of FIG. 1. It directly interacts with the fans registration module 147 (of FIG. 1) in one embodiment, and thus facilitates the new registration of a mobile user from a mobile device 203 who wants to become a fan of a specific artist or singer in accordance with the present invention.

A purchase module 213 of the interactive media client 205 is a client component that facilitates the purchase of the songs online or CDs from the mobile device 203. It interacts with the sales manager module 139 of FIG. 1 in accomplishing the purchase process. For example, the purchase module 213 gathers all the information entered into an invoice screen presented to a user. It tracks the songs selected from a CD in the invoice screen and associates them with their price and calculates the total. It communicates all the entries and the results from the invoice screen back to the server 105 of FIG. 1 for processing. It also tracks the payment made by the mobile device 203 user fans and completes the transaction successfully with proper interface for the user entries.

The online billing module 209 performs the function of online transaction during the purchase of the songs online. It gathers the collection of the online purchase details furnished by the mobile device 203 user (fans) and activates the downloading of the songs purchased. It also accomplishes a bank cheque (offline purchase) based purchase of the CD. The bank cheque details and the shipping address of the CD, etc. are communicated to the server and in turn to the music company that is marketing the song's CD. Prompting of a mobile device user for acknowledgement during a successful online transactions is also facilitated by the online billing module 209.

Feedback module 215 is the client module that interacts with the feedback gathering module 141 of FIG. 1 in gathering all mobile device 203 user/fans' interactive media review information from all the mobile device(s) and sends it to the server 105. The feedback information from the mobile device 203 is a very important statistics to the artist or music company, which may make vital decisions based on such gathered statistics. For example, it may decide to whether release the songs of a proposed CD into the market or not, based on such statistics. This information also provides a ground for them to make new strategy of marketing.

The configuration module 211 helps with configuration of the user experience and the interactive media client 205 behavior. It facilitates the customization/fine tuning of the interactive media screen settings on the mobile device 203, based on user preferences or device capabilities or both. This can effect the appearance of the screens or the order in which content is displayed/rendered. The configuration information managed by this module may be selectively communicated to the media distribution server. This configuration module 211 can also facilitate the configuration of the mobile device 203 hardware information to enable the best display of the screens.

The user input interface 217 provides support for the menu items and buttons that a user employs to interact with the interactive media client. For example, it supports user selections using a 'select' and 'cancel' softkeys/buttons from the keypad of the mobile device. It also supports changing the menu items associated with the softkeys, and the way they are programmed for new functionality. It makes it possible to change menu items or add new ones, such as adding a menu item for "make ringtone" and providing a menu item for "next" item for display. These menu items are associated with functions performed by the interactive media client and with features provided, as required in this invention, during the review of the songs and the purchase of items, downloading ringtones associated with songs, and interacting with the fans club server, etc. The reconfigurable functionality of the softkeys (select and cancel default functions) provides the additional flexibility to accomplish the different objectives through softkey option button selections.

Figure 3:
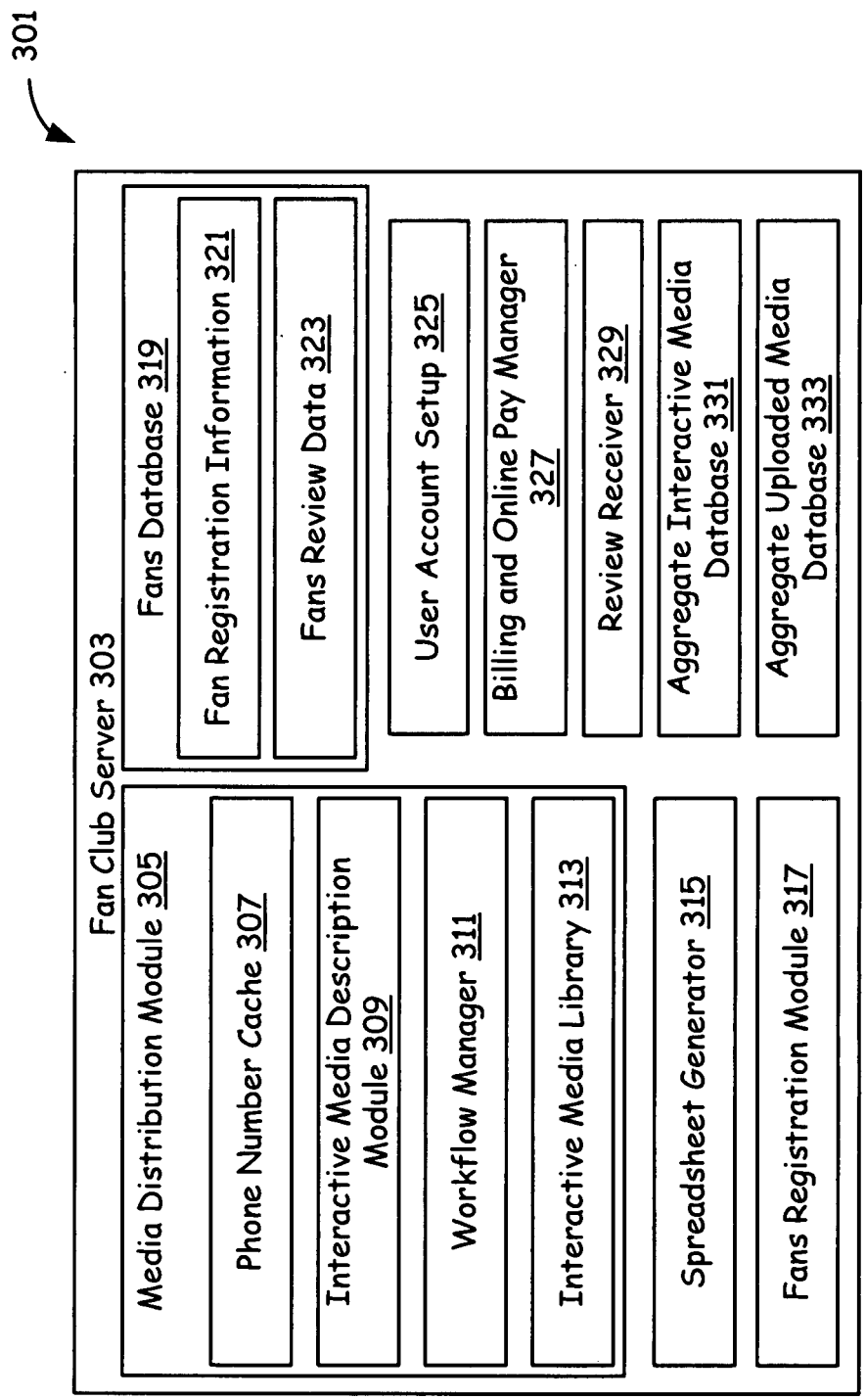
FIG. 3 is a block diagram of an exemplary fans club server and its components, in accordance with the present invention.

FIG. 3 is a block diagram 301 of an exemplary fans club server 303 and its components, in accordance with the present invention. The fans club server 303 facilitates mobile phone users to register as fans of their favorite singer or artists. The mobile phone users can register to receive newly created material (songs, music, videos, paintings, artwork, etc.). They can then review these newly created material, provide feedback to the artists, purchase songs and download them, make ringtones of their selected songs, etc. The user reviews are stored in a database called the fans database 319. Using the review data collected, the fans club server 303 calculates statistics that helps music companies make vital decisions. The review data can also be retrieved by an authorized music company along with other computed statistics, thus providing them feedback on the quality of the songs and the expectations of the fans.

The fans club server 303 facilitates at least two main objectives—the first one being enabling any mobile device user to register from his/her mobile phone as a fan of his/her favorite singer to receive sample music that can be reviewed and feedback communicated back to the artist/fans club server 303. The second objective being making available songs that are in a review stage for purchase by fans online on their mobile devices. Apart from these there are other functionalities that a fans club server accomplishes. Such functionalities are typically setting up a user account, receiving the review data from fans, maintaining a registration and review database, and processing the review data collected from the fans to generate the statistics in a spreadsheet, that can be downloaded or communicated to others. The other aspects of the fans club server functionalities comprise facilitating online and offline music purchase from a specific music company or a specific singer, maintaining all the receipt and the billing information, inserting mobile advertisements into interactive media sent to the fans, etc.

In one embodiment, the media distribution server 107 of FIG. 1 does the function of generating the interactive media and its distribution among the mobile phone users, while interacting with the fans club server 303 as necessary. The starting inputs in the form of interactive media, such as songs/music/videos/multimedia, for generating the interactive media are provided by a client computer from which an artist or a music company provides these inputs.

In one embodiment of the present invention the interactive media generation and its distribution is performed by the fans club server 303 module called the media distribution module 305. It receives the multimedia with music contents from the client computer 109 of FIG. 1 of the artist or the music company and generates the interactive media. The generated interactive media are distributed among the mobile devices of the registered fans of an artist. In one embodiment, the workflow manager 311 facilitates the setting up of the handshake communication protocol during the exchange of control information, embedded program codes, and other messages between the mobile phone 135 of FIG. 1 and the fans club server 303 so as to assemble and deliver display screens to the mobile phone 135.

An interactive media library 313 contains all the generated interactive media stored in the form of a library. It includes a music library, a video library, a graphics library and other categories of content to be delivered. In addition, it maintains a queue of interactive media to be delivered to the mobile device 135 and an old interactive media queue of interactive media already delivered to the mobile device 135.

An interactive media description module 309 receives the multimedia with music contents as inputs from an artist or a music company, typically sent from a client computer. It also receives the interactive inputs (such as user response and control information) from the mobile phone users and dynamically generates new interactive media or new portions of a current interactive media and delivers it to the mobile device 135. A phone number cache 307 is associated with the media distribution module 305 for temporary caching of the fan's mobile phone numbers during the interactive media distribution process.

A fans database 319 of the fans club server 303 comprises fans registration information 321 and the fans review data 323. The fans registration information 321 contains all the registration information of the fans, and their subscription information. A registrant in this database can be a fan of multiple artists. Being a fan of multiple artists is supported by the subscription module 145 of FIG. 1. The fan's review data 323 is the song wise and artist wise review information submitted by an individual fan within his account.

A spreadsheet generator module 315 retrieves the fans review data 323 and sorts it out in artist wise and generates artist wise spreadsheet from which it computes the statistics. The computed statistics enables the music company to conclude whether to release the music CD in the market or not in its current form, based on feedback received. The decision can be based their level of confidence and the computed confidence factor (computed statistics).

The fans registration module 317 (147 of FIG. 1 repeated) facilitates the new registration a user performs from his mobile phone 135 of FIG. 1. A fan can forward and prompt some other mobile phone user to become a fan of his artist by sending the list of songs on a screen with a register soft button. He can play those songs on his mobile phone and decide to select register soft button from the forwarded screen and may decide for a registration. He will be guided successively until he successfully finishes the registration. During this process he interacts with the fans club server via the fans registration module 317. Once a user registers, he will have an account setup for him which he can further configure and customize. The user account setup module 325 facilitates the configuration of an user's account. An user is a fan of at least one registered artist on the fans club server 303. The fan can add more number of artists into his/her account and the fan club server 303 facilitates the review and online purchase of their songs.

A billing and the online pay manager 327 manages all the billing and the online payment for the songs or CDs that are purchased. It also maintains the offline purchase details. The offline purchase is the delivery of the songs on a CD to the mobile phone user address. The mobile phone user pays through sending bank cheque with all its details provided online.

A review receiver 329 receives all the reviews provided by the mobile device user during the review of a song and aggregates them into the fans review data 323. An aggregate interactive media database 331 on the fans club server 303 stores all the aggregation of the generated interactive media collected in the past and those currently provided by users at present (i.e. new ones). Thus this database 331 constitutes a reference database. All the newly uploaded multimedia with the music contents are aggregated into a database called the aggregate uploaded media database 333. The interactive media description module 309 retrieves all the uploaded multimedia with music content and generates the interactive media that are subsequently delivered to the fan's mobile phone.

Figure 4:
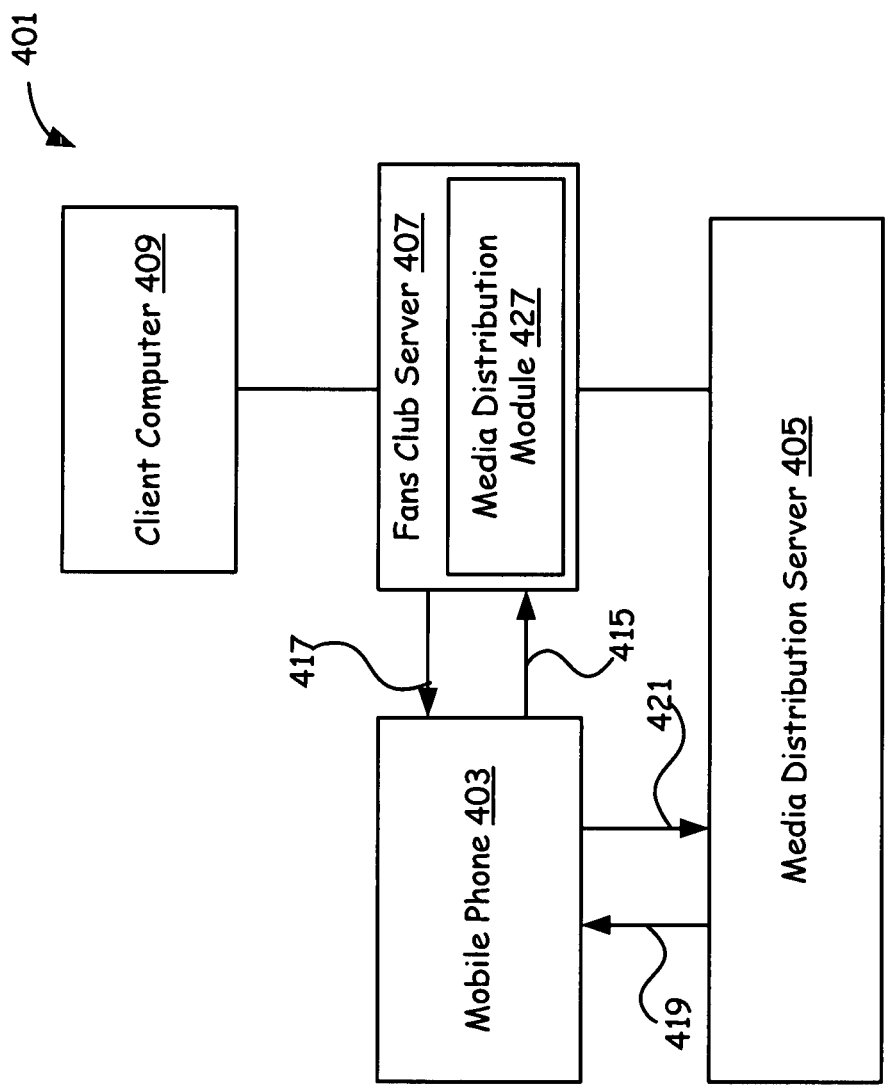
FIG. 4 is perspective block diagram of a fan review system wherein a mobile phone interacts with a media distribution server, a fans club server and a client computer used by an artist, in accordance with the present invention.

FIG. 4 is perspective block diagram of a fan review system 401 wherein a mobile phone 403 interacts with a media distribution server 405, a fans club server 407 and a client computer 409 used by an artist, in accordance with the present invention. The mobile phone 403 relies upon the fans club server 105 or the media distribution server 107 of FIG. 1 for some of the operations such as interactive media description and delivery in the form of an interactive media or screens successively delivered to the fan's mobile phones. The options selected by a mobile phone user from the screens presented on the mobile phone 403 act as a request or control information sent to the media distribution server 405 or the fans club server 407 for deciding the next course of actions. The information sent to the mobile phone are basically the message text, textual descriptions of interactive media, multimedia music contents, embedded programs, option button display text, multiple choice selections, inserted advertisements, references to advertisements already available in the mobile phone, configuration information, etc.

Typical interactions in the fan network 103 of FIG. 1 is a two-way (simultaneous transmission in both directions) operation on the network that is employed during an entire communication transaction process, thus shown with two opposite arrows in FIG. 4 between those entities. This indicates that the data transmission is in two directions. The client computer 409, the fans club server 407, the media distribution server 405 and the fans club server are also communicatively coupled using the network 103 of FIG. 1.

In the process of the interactive dataflow shown in FIG. 4, server side programs interact with the client side programs (or scripts). This results in providing the dynamic contents delivered from the server to the mobile phone, as needed. From the server side the programs generate the interactive media or screens to be displayed on the mobile phone 403, receiving the inputs from the client computer 409 and the mobile phone users from their mobile phone 403.

The fans review system comprises the client computer 409 (similar to 109 of FIG. 1), the mobile phone 403 (similar to 135 of FIG. 1), the fans club server 407 (similar to 105 of FIG. 1) and the media distribution server 405 (similar to 107 of FIG. 1) that are all communicatively coupled using the network 103 of FIG. 1. From the client computer 409 a music company or an artist uploads the songs or the multimedia with music contents to be reviewed before releasing it into the market. The artist uses the multimedia creation tool (mentioned as 121 of FIG. 1) from the client computer 409 for developing the multimedia content, such as a CD with music contents).

In one embodiment, the client computer 409 uploads the multimedia content with the music contents to the fans club server 407. The interactive media description module 309 of FIG. 3 of the fans club server 407 generates the interactive media that will be delivered to the mobile phone 403. The user interacts with the interactive media to evaluate its contents and selectively provide feedback. During the generation of the interactive media from the fans club server 405, the interactive media description module 427 assembles a questionnaire that comprises a collection of items, one item per song for example, with multiple choices for each item for user feedback, and an optional graphics/image for display. This questionnaire is communicated to the mobile phone 403 along with the other multimedia contents and the text to be displayed for the soft button option buttons.

The media description module 427 of the fans club server 407 describes the interactive media with the multimedia with music contents. It provides information, for each song/music in a CD/DVD or collection, on the genre, the size of the songs/music, the date of creation, the identification information, details about its creation and recording, its release dates, etc. It generates the interactive media based on components provided in one embodiment, wherein the components can be individual songs/music items, graphics, video portions, textual portions, templates, etc., and queues them up into a music library and stores in interactive media library 313 of FIG. 3.

Figures 5A, 5B:
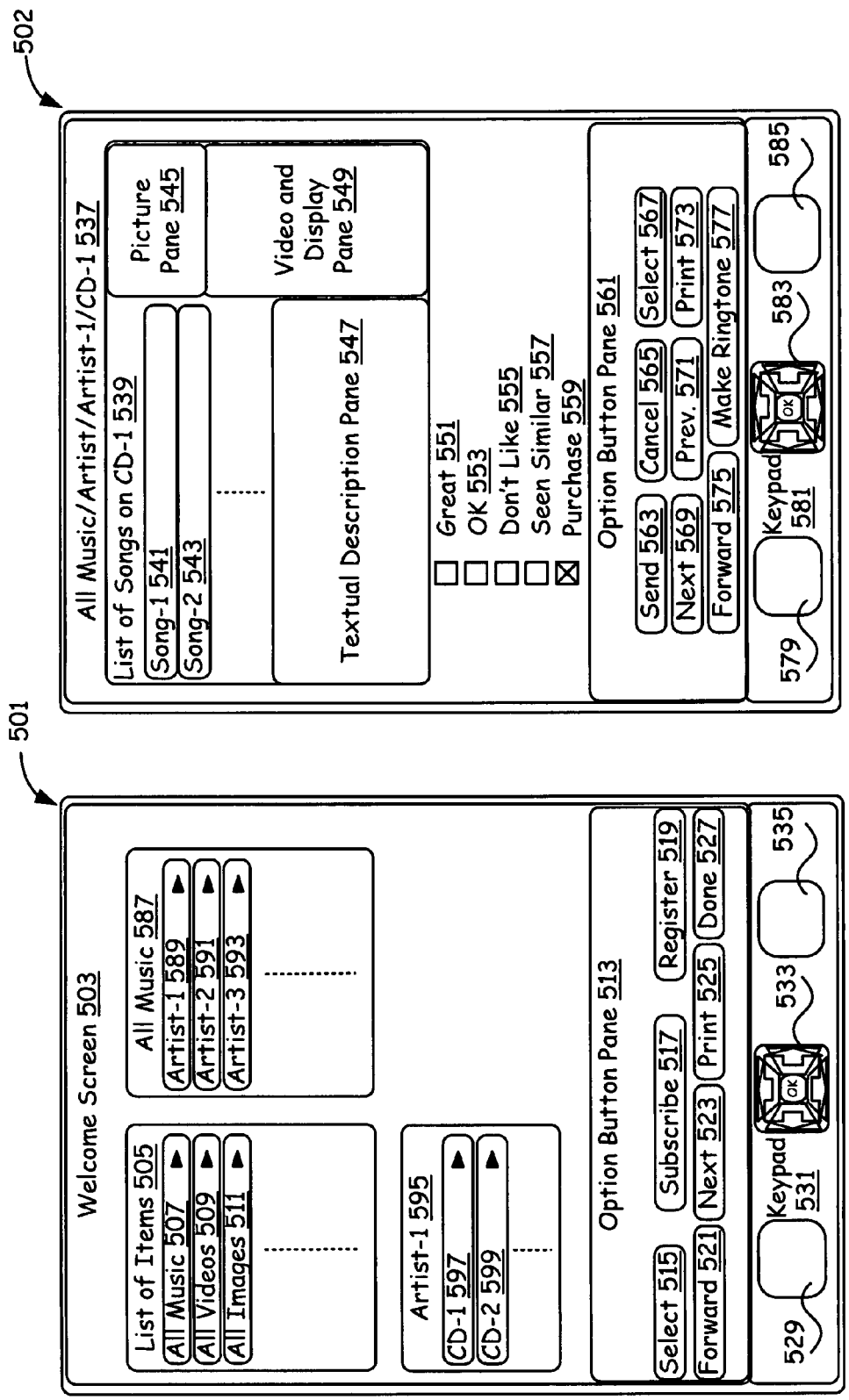
FIGS. 5(a) and (b) are screen snapshots of the mobile phone during the delivery of an interactive media with music contents and the retrieval of fans review, in accordance with the present invention.

FIGS. 5(a) and (b) are screen snapshots of the mobile phone during the delivery of an interactive media with music contents and the retrieval of fans review, in accordance with the present invention. The media distribution module 305 of FIG. 3 distributes the interactive media with music contents on all the registered mobile phones. The first screen is the welcome screen on which a list of all the media libraries will be presented. It contains a list of items such as music, videos, images etc. as menus, with each menu opening into submenus.

When user selects "All music" menu it opens into another submenu containing the artists names who have registered and uploaded their media with music contents on the fans club server 105 of FIG. 1. Each artist are released their latest songs on different CDs. When mobile phone user selects an artist name it opens into another level of submenu containing all the CDs with recently released songs by that artist. When a CD is selected from the submenu list by the mobile phone user the media distribution module 305 loads the contents of the selected CD as a list of songs in a new screen, in accordance with the present invention.

If the mobile phone user selects any songs from the new screen a textual description of the song is displayed in a text pane and associated graphics displayed in the video display pane. Image of the artist will be displayed in the picture pane. A questionnaire question/item in the form of multiple choices is displayed in a separate pane/window.

The screen snapshot 501 of FIG. 5(a) is the welcome screen 503 with the associated menus and submenus. The list of items menu 505 has all the components of the interactive media library categorized as all music 507, all videos 509, all images 511, etc. with each one them having submenus associated with them indicated by an arrow head. In this exemplary screen snapshot 501, the menu item 507 is selected to open its submenu all music 587. The submenu 587 has the artist wise categorization such as artist-1 589, artist-2 591, artist-3 593, etc.

Submenus corresponding to each artist have all the CDs on which the new songs are expected to be released after the review process. An example item from the 587 submenu is selected as artist-1 589, which opens as a next level of the submenu artist-1 595. This submenu has many items which are basically different CDs such as CD-1 597, CD-2 599, etc. from the same artist, artist-1 589 opened as a submenu 595. Each CD is a group of songs on it, planned to be released after the review done by the mobile phone user fans.

The option button pane 513 of the welcome screen 503 of FIG. 5(a) has "select" 515, "subscribe" 517, "register" 519, "forward" 521, "next" 523, "print" 525, and the "done" 527 soft buttons. The "select" 511 soft button selects an item from the menu. The "subscribe" button 517 facilitates the subscription for new services and allows the mobile phone user to include to his account setup an additional artist as his/her favorite.

The "Register" 519 soft button is used for registering as new fan of a specific artist. The "Forward" 521 soft button allows the current mobile phone user to forward the current screen to some other mobile phone user so that he can do reviewing/purchasing, etc. and do fresh registration if he is not registered yet on the fans club server as a fan.

The "next" 523 soft button displays next screen, "print" 525 soft button to print the current screen on a wireless printer, and the "done" 527 soft button restores the power on screen.

The keypad 531 contains the joystick 533 for navigating in the list and submenus, a select button softkey 529 and the cancel softkey 535. The select softkey 529 selects the submenus, items, etc. the cancel softkey 535 takes the mobile phone back to the previous submenu, item, etc.

When a user selects and opens a CD item, all the songs on it are displayed on a next screen 502. As an exemplary CD item, CD-1 597 of FIG. 5(a) is selected to open the corresponding screen 537. Its path is displayed as "All Music/Artist/Artist-1/CD-1" for tracing back with respect to the welcome screen. When the selection of a song is done using the softkey from the keypad 581, key 579, the audio clip or entire song will be played on the mobile phone 135 of FIG. 1. Apart from this, a textual and a video description of the song will be depicted in the separate panes viz. 547, and 549 respectively. Also an image or a photo of the singer artist will be displayed in a separate pane 545.

Just below the textual description pane 547 is the questionnaire in the form of multiple choice presented to the mobile phone user. The multiple choice consists of the items viz. "Great" 551, "OK" 553, Don't Like" 555, "Seen Similar" 557, and "Purchase" 559 options with each of them associated with a radio button. The mobile phone user will select any of these items by clicking the respective radio button. Upon selection of the radio button, an associated numerical value with each choice item (excluding the purchase option) will be taken as a sample value (or review). If the mobile phone user selects the purchase 559 option radio button, a purchase process will be initiated.

From the screen 537, a mobile phone user can make arbitrary selection of songs from within a CD or from different CDs and rate them according to his opinion. Also he/she can opt for purchasing using the radio button option "purchase" 559.

The option button pane 561 of the CD-1 screen 537 of FIG. 5(b) has "send" button 563, "cancel" 565, "select" 567, "next" 569, "prev." 571 "print" 573, "forward" 575, and "make ringtone" 577 soft buttons. The send button 563 sends the review of the currently evaluated song. The cancel button 565 facilitates the cancellation of a selection already done. The select button 567 selects an item, submenu, etc. The 'next' 569 and the 'prev' 571 buttons help in navigation to next screen or a previous screen. The 'print' button 573 is used to print the screen content on a wireless printer. The "Forward" 575 soft button allows the current mobile phone user to forward the current screen to some other mobile phone user so that he can do reviewing/purchasing, etc. and do fresh registration if he is not registered yet on the fans club server as a fan of listed artists on that fans club server. The "Make ringtone" 577 soft button allows mobile phone user make the currently played/reviewed song as his/her ringtone on their mobile phone.

The keypad 581 contains the joystick 583 for navigating in the list, a select softkey 579 and the cancel softkey 585. The select softkey 579 selects the submenu, items, etc. the cancel softkey 585 takes the mobile phone back to the previous submenu, item, etc.

Although FIG. 5(b) shows an options button pane 561 comprising several buttons, it should be appreciated that these selectable buttons can be displayed as menu items in a drop down menu. Thus, in a related embodiment, the buttons of the options button pane 561 are presented to a user as menu items that can be selected by a user from a menu that opens up when an appropriate softkey is activated by the user. The same is true for the option button pane 513 of FIG. 5(a)

FIG. 6 is a screen snapshot of the mobile phone during a purchase of songs or CDs by fans, in accordance with the present invention. When the mobile phone user initiates the purchase operation by selecting the "purchase" 559 button option from FIG. 5(b) and sends the purchase list using the send 563 button from FIG. 5(b) the fans club server 105 of FIG. 1 generates the invoice screen and communicates back to the mobile phone.

Figures 6A, 6B:
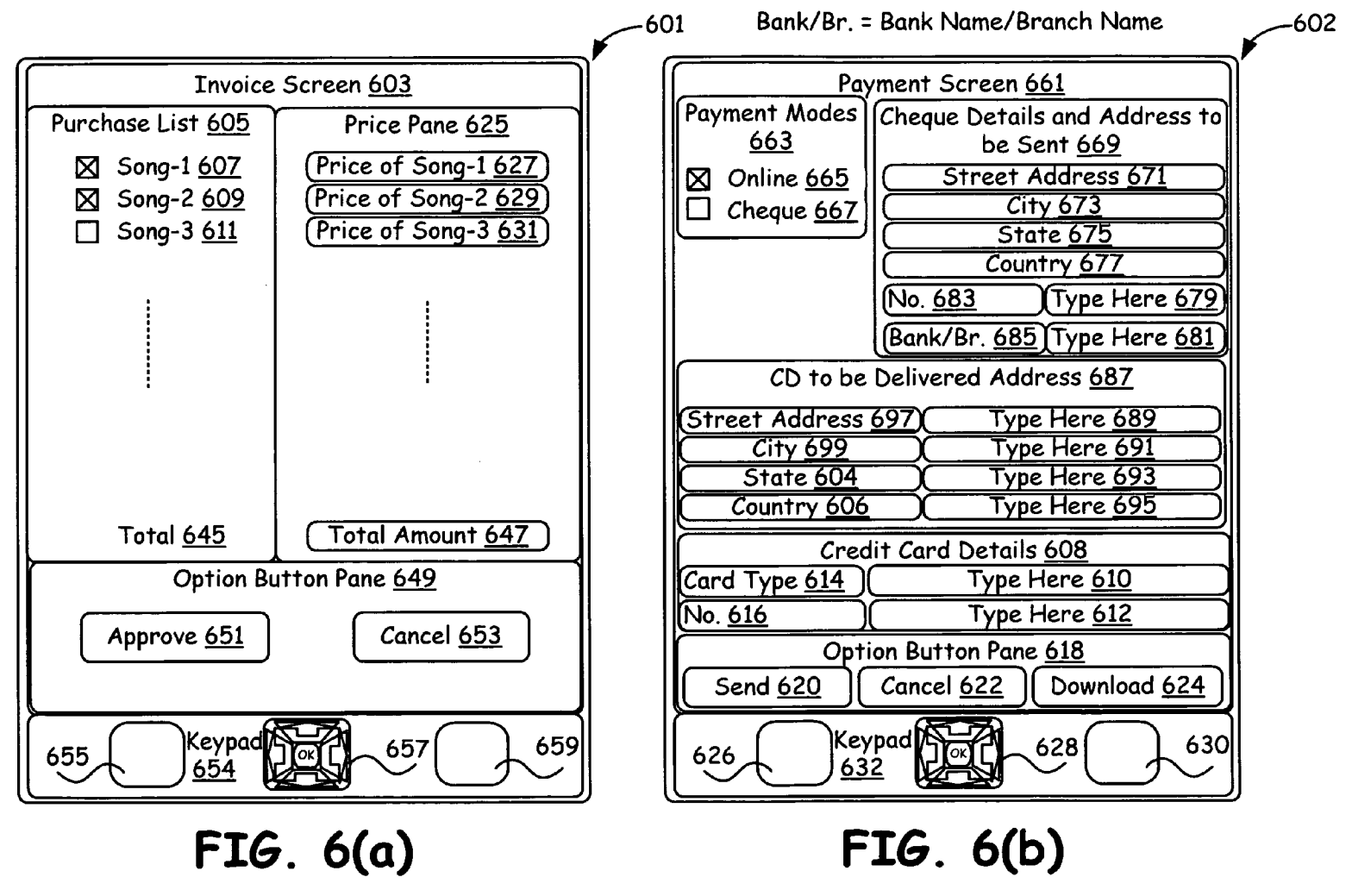

The screen snapshot 601 of FIG. 6(a) is the invoice screen 603 which contains all the selected songs from the purchase option screen of FIG. 5(b). The invoice screen 603 contains the purchase list pane 605 and the price pane 625. The purchase list pane 605 contains all the selected songs for purchase from the previous screen (FIG. 5(b)) associated with radio buttons. The "Purchase" selected songs 607, 609, 611, etc. are the further shortlisted by a radio button selection. The shortlisting will be done for the convenience of purchase looking at the price of each song from the price pane 625.

When a song is selected using the radio button, its price gets displayed or highlighted in the price pane 625. The total 645 button is the total of all the songs appear in the price pane 625 in the field labeled total amount (647). The totaled numerical value that gets displayed is the sum of all the prices of the selected songs using their radio button. The price of each song will be displayed in the field labeled "price of song-1 627, price of song-2 629, price of song-3 631, etc. in the price pane 625. Totaling will be done dynamically upon selecting or deselecting of each song from the purchase list pane 605.

Upon totaling the prices for the selected songs mobile phone user selects "approve" soft button 651 which sends this information to the fans club server. The mobile phone user can also cancel the purchase transaction using the "cancel" 653 soft button.

The keypad 654 comprises joystick key 657, selection key 655, and the cancel key 659. Navigation within a menu is accomplished using the key 657. Selecting a menu or a submenu is accomplished using the selection key 655. A selection can be deselected using the cancel key 659. When the mobile phone user approves his/her invoice using the approve button 651 selection, the fans club server sends another screen to prompting payment with modes of payment.

The screen snapshot 602 of FIG. 6(b) is the payment screen through which the mobile phone user does the payment for the purchase selections he has made in the previous invoice screen of FIG. 6(a). The payment screen 661 has payment mode pane 663 which contains two options viz. online 665, and the cheque 667 options each associated with a radio button.

If the user opts for online payment 665, then a credit card details window 608 pops up. The credit card details window has all the details a mobile phone user has entered. The card type 614 is the text prompting the mobile phone user to enter the credit card type in the "type here" field 610. The credit "No." text 616 prompts the mobile phone user to enter the credit card number in the "type here" field 612. Upon entering the details the user can submit those details by selecting the send soft button 620 from the option button pane 618.

If the mobile phone user selects the Cheque option 667 from the payment modes pane 663, then the bank cheque details and address to be sent window 669 pops up. This window prompts user to enter the bank cheque number with a text label display 683. User enters the bank cheque number in the "type here" field 679. The bank name and its branch are prompted with a text message label Bank/Br. 685. User enters the name of the bank and its branch name in the "type here" field 681. He will send the bank cheque to the address furnished in the field within the same pane 669. The street address 671, city 673, state 675, and the country 677 names are displayed for the user information to the where the bank cheque has to be sent.

Further the user is prompted with a CD to be delivered address pane 687. It contains the text display labels corresponding to the street address 697, city 699, state 604, country 606 labels. In response to this messages user enters the street address in the 689 "type here" field, city in the 691 "type here" field, state in the "type here" 693 field and the country in the "type here" 695 field to furnish his contact address to which the CD to be sent.

Upon providing all the details for either the online or the Cheque options the user sends the information to the fans club server using the "send" soft button 620 from the option button pane 618. Transaction entries can be cancelled using the "cancel" soft button 622. For the online purchase option, user can download the purchased songs using the "download" soft button 624. Again the keypad 632 contains a joystick 628 for navigation within a menu or a submenu. A selection key 626 facilitates the selection functionalities and the cancel key 630 facilitates the cancellation of the current selections.

FIG. 7 is the block diagram showing the embedded components of an interactive media delivered to the mobile phones, in accordance with the present invention. The contents that are embedded into the XML code corresponding to a interactive media contents 719 sent to the mobile phone are textual content 703, multimedia containing the audio and video clips 705, image contents 707, questionnaire text 709 such as textual descriptions of individual questions of a questionnaire and associated multiple choice text/labels, softkey configuration control information 711, display configuration information 713, feedback queries 715, and the option button text 717.

The textual contents 703 embedded in the XML code and sent to the mobile phone is a brief description of the songs such as writer and singer names, title of the song, recorded date, etc. The audio and video content 705 is the actual multimedia content delivered to the mobile phone user for review and purchase. The image content includes the image of the artist displayed on the screen of FIG. 5(*b*) in the picture pane 545.

The softkey configuration information 711 contains the code that runs and reconfigure the softkeys on the keypad for new functionalities. The display configuration 713 contents include the information that configures the screen display on mobile phones of different make. Feedback queries 715 contents include the queries sent to mobile phone for gathering the response from the mobile phone user. The option button text 717 is the text displayed on any option soft buttons in the option button pane of the screens delivered on the mobile phones.

Figure 8:
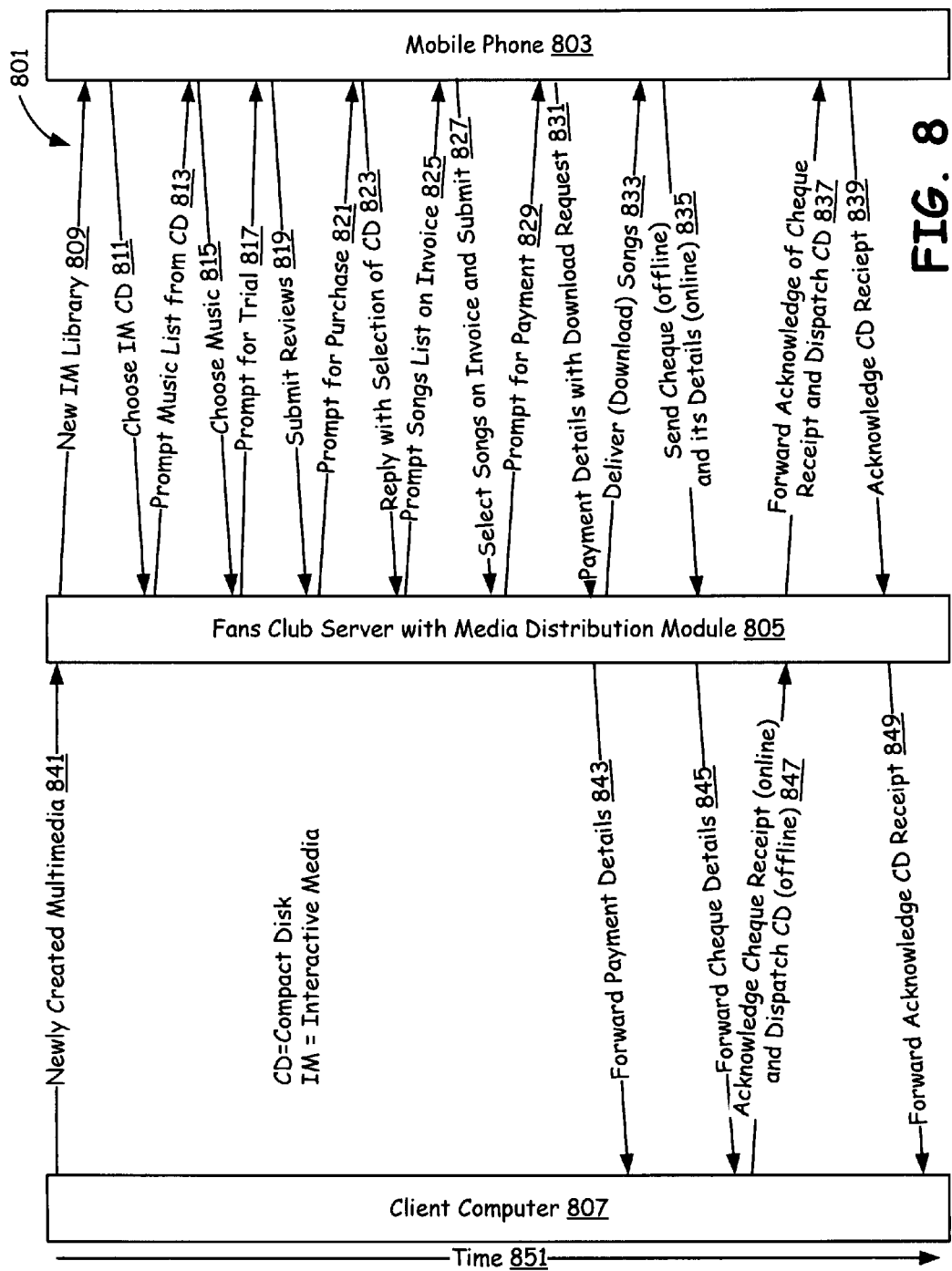
FIG. 8 is the handshake communication protocol setup between various entities on the network during the fans review and purchase of the music CD, in accordance with the present invention.

FIG. 8 is the handshake communication protocol setup between various entities on the network during the fans review and purchase of the music CD, in accordance with the present invention. The entities that are involved are the mobile phone 803 (135 of FIG. 1 repeated), fans club server with the media distribution module 805 ((105 of FIG. 1 repeated), and client computer 807 (109 of FIG. 1 repeated).

During the delivery of the music and other multimedia contents in the form of interactive media to the mobile phone from the fans club server messages, contents, (Java) code, and control information are exchanged between them in a predefined sequence. The interactive media is generated dynamically by the interactive media description module 309 of FIG. 3 by receiving the inputs from the client computer 807 and from the mobile phone 803.

The inputs from the client computer 807 are the multimedia with music contents created by the multimedia creation tool 121 of FIG. 1. The other inputs from the client computer 807 are artist image or picture uploaded from the client computer 807 to the fans club server 805. Inputs from the mobile phone are interactive and dynamic and depend on the decisions made by a mobile phone user during his interaction with media delivered on his mobile phone.

The message or the control information emerging from an entity is represented as an emerging arrow towards the destination entity shown skewed to indicate the inherent time delay during the data/information transmission back and forth on the network 103 of FIG. 1. The timeline 851 on left of FIG. 8 indicates the progressing time. Newly created multimedia content message 841 is uploaded from the client computer 807 to the fans club server 805. This includes other contents such as artist image, pictures, etc. The fans club server's interactive media description module 309 of FIG. 3 generates new interactive media and stores in a music library (507 of FIG. 5(*a*)).

The New interactive media library 809 message is delivered to the mobile phone 803. From the mobile phone, user interactively selects list of CDs by sending the choose CD message 811 to the fans club server pertaining to an artist such as a submenu "artist-1" 595 of FIG. 5(*a*) and opens the artist/CD screen 537 of FIG. 5(*b*) delivered by the fans club server 805. User selects a CD from list of CDs delivered to the mobile phone by sending the choose CD 811 control information to the fans club server. In response to this fans club server delivers list of songs on a CD by delivering a new screen of FIG. 5(*b*) as a new message 813. The mobile phone user selects songs of his choice from the presented screen as described in the FIG. 5(*b*). This screen contains all the songs on a selected CD from where the mobile phone user will choose songs, review and submit as explained with FIG. 5(*b*).

From the selected CDs of an artist mobile phone user selects songs and play them for trial. Depending on his/her feeling/opinion towards the song, they answer the questionnaire by clicking the corresponding radio button from 551 to 559 as described with FIG. 5(*b*). Chosen music from the CD is communicated to the fans club server as the choose music message 815. In response to this the fans club server sends a message 817 prompting the mobile phone user for a trial. The mobile phone user plays each of the selected songs and rates them using the multiple choice radio button (FIG. 5(*b*)) and submit reviews as control information 819 to the fans club server.

Next the fans club server prompt mobile phone user for a purchase sending a message 821. In response to 821 the mobile phone user responds by a selection CD through the control information 823. When the CD is selected and communicated to the fans club server, the list of songs on the CD is presented to the user on an invoice form screen as explained in the FIG. 6(*a*) in the form of the message 825 sent to the mobile phone user. Selected songs from a CD or group of CD from an artist or different artist are communicated back to the fans club server from the invoice screen of FIG. 6(*a*) in the form of message 827.

Upon message 827 the mobile phone user will be prompted for payment by presenting screen of FIG. 6(*b*) with message 829. The payment details with the download request are submitted by the user as message 831 to the fans club server. This payment details are forwarded to the client computer as the message 843 the information of the music company. In the meantime mobile phone user is prompted with download message 833.

If the mobile phone user opts for an offline purchase sending a bank cheque to the music company he/she will enter the bank cheque details and the contact address details as message 835 which will be forwarded to client computer as message 845. The music company from the client computer 807 will send an acknowledge message 847 to the fans club server 805 on the receipt of message 845 and dispatch the music CD subsequently. The fans club server forwards 847 as a forwarded acknowledgement 837 to the mobile phone. When the CD is received by the mobile phone user he/she will acknowledge the CD receipt to the fans club server as the message 839 which gets forwarded as message 849 to the music company client computer 807.

Figure 9:
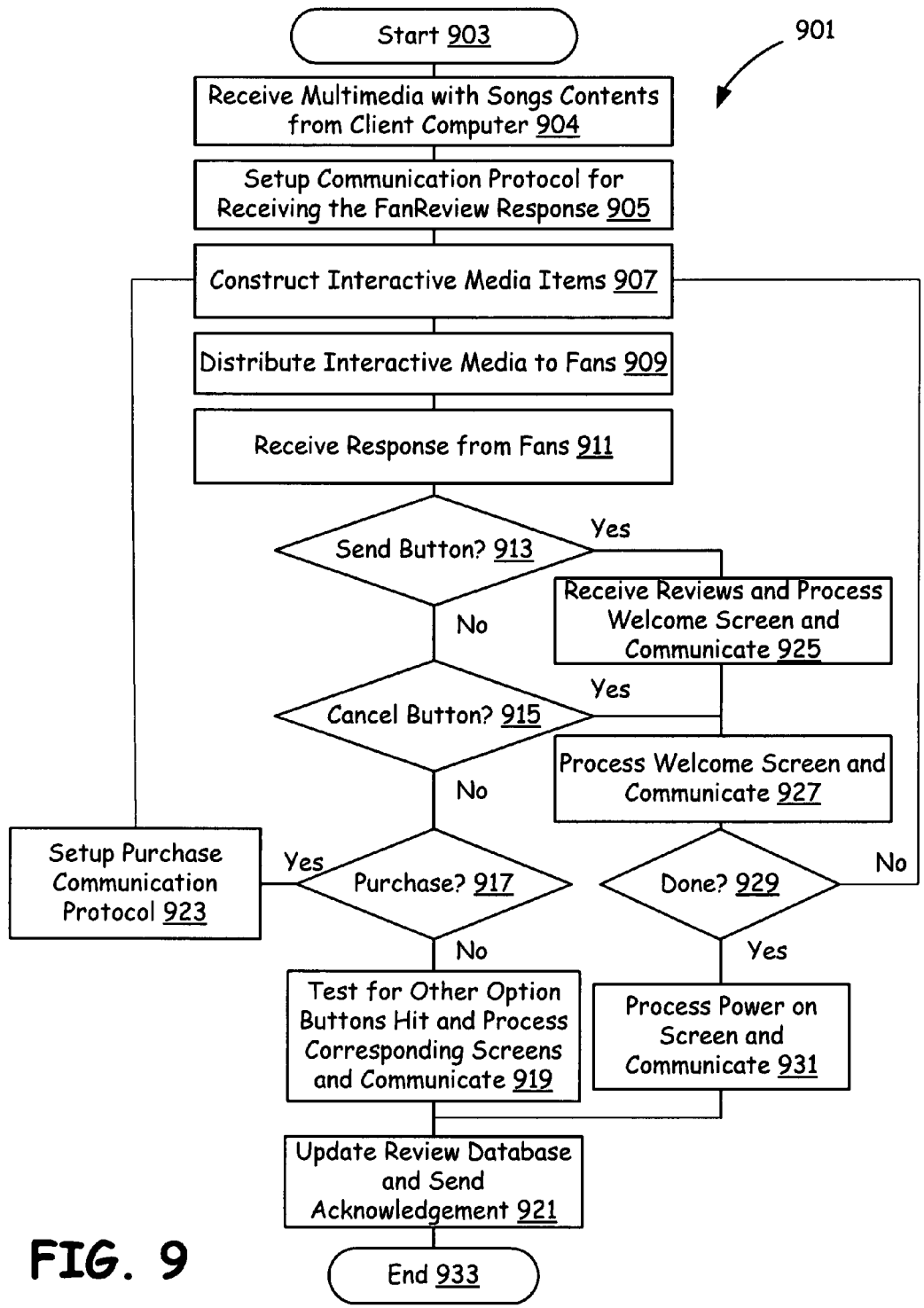
FIG. 9 is a flowchart for the action performed by the fans club server during its interaction with mobile phone, in accordance with the present invention.

FIG. 9 is a flowchart for the action performed by the fans club server during its interaction with mobile phone, in accordance with the present invention. The fans club server 105 receives multimedia contents and metadata inputs from the client computer 109 of FIG. 1. In order to distribute the interactive media on the mobile phone the fans club server's workflow manager 311 of FIG. 3 sets up a handshake communication protocol. The interactive media description module 309 of FIG. 3 generates the interactive media and delivers it to the mobile phone.

Flowchart 901 of FIG. 9 is the process performed by the fans club server during distribution interactive media and its subsequent interaction with the mobile phone. After starting at 903, at the next block 904 it receives starting inputs from the client computer in the form of multimedia with music contents, at the following block 905 the fans club server's workflow manager 311 of FIG. 3 setups a handshake communication protocol for an interaction with the fan's mobile phones. At the next block 907 it generates the interactive media based on the music company provided external inputs such as the multimedia music contents and its metadata. Upon this it distributes the generated interactive media at the next block 909 on fan's mobile phones.

At the next block 911 the fans club server receives the response from the mobile phone user interaction data in the form of music review data and the option selection control information, etc. At the decision block 913 the fans club server checks whether send button pressed on the mobile phone. It it's true at the next block 925 it receives the music review information and processes the welcome screen and delivers to mobile phone. Otherwise the fans club server checks whether cancel button selected at the decision block 915. If it's found to be true it processes the initial welcome screen and communicates to the mobile phone.

After processing the welcome screen at the block 927, the fans club server checks whether the user selected the done option button at the decision block 929. If it's found to be true it process the power on screen at the block 931, delivers on the mobile phone and proceeds to the block 921 to update the review database and acknowledge the mobile phone user. At the decision block 929, if the test fails it goes back to the block 907 from where it checks whether there is any new multimedia contents uploaded by any client and proceeds.

At the decision block 915, if test fails, it goes to the next decision block 917 to check whether the purchase option button is selected by the user. If it's found to be true, it sets up the purchase communication protocol and processes the purchase operation. After performing the purchase operations at the block 923, it goes back to the block 907 from where it checks whether there is any new multimedia contents uploaded by any client and proceeds.

At the decision block 917 if the test fails, it goes to the next block 919, at the block 919 the fans club server checks whether other option buttons are selected and processes the corresponding screens and communicate them to the mobile phone. Following this it updates the review database and sends the necessary acknowledgement to the mobile phone users at the block 921 and ends the operation at the block 933.

Figure 10:
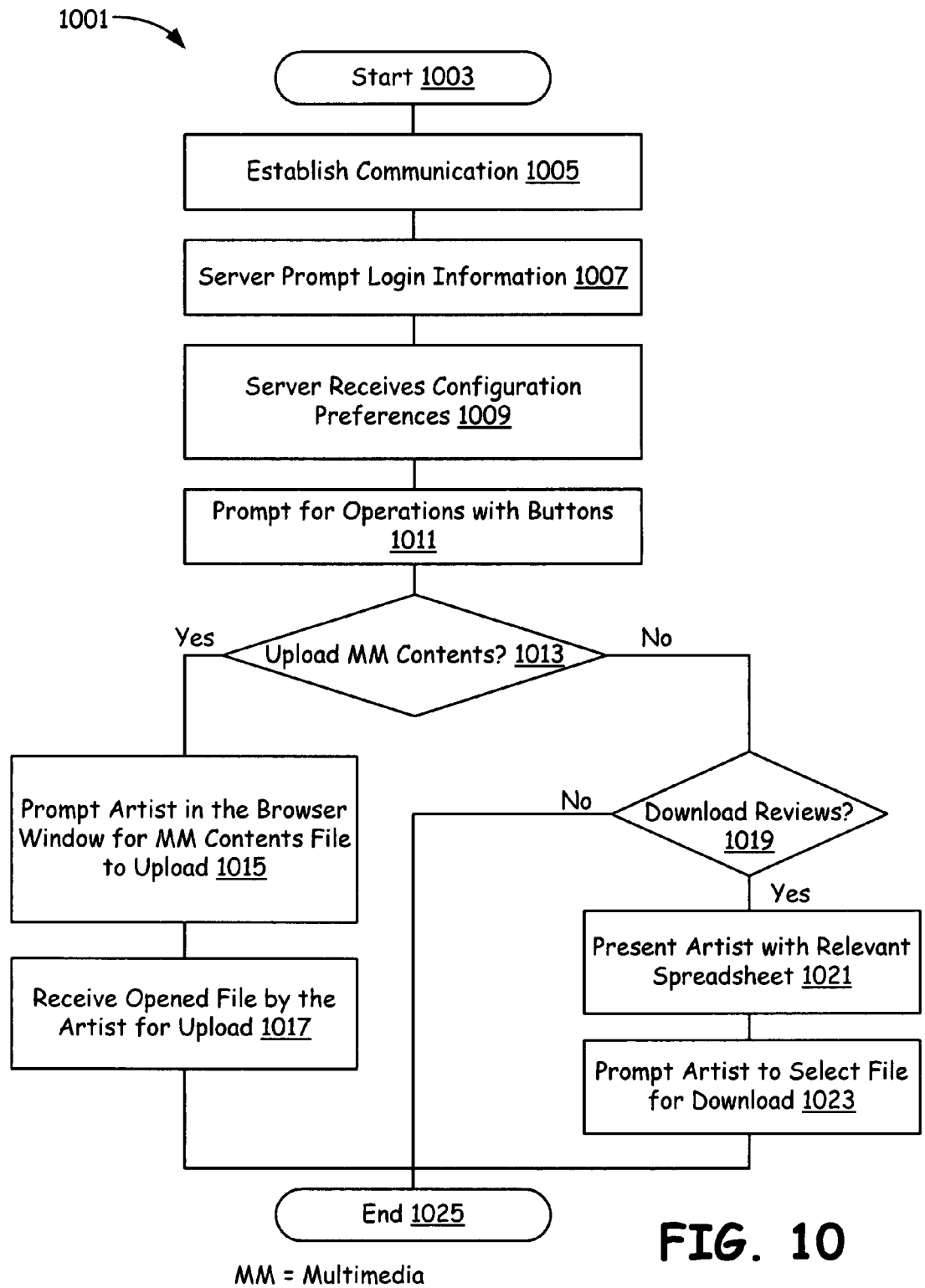
FIG. 10 is a flowchart for actions performed by the fan club server during its interaction with the artist client computer, in accordance the present invention.

FIG. 10 is a flowchart for actions performed by the fan club server during its interaction with the artist client computer, in accordance the present invention. In the process of performing the delivery of the multimedia with music contents to the mobile phone users for review an artist or a music company create the multimedia with music contents and upload on the fans club server. The fans club server generates the interactive media and delivers on the all the fan's mobile phones.

An artist or a music company communicates with the fans club server for two main purposes viz. uploading the multimedia with music contents and for downloading the mobile phone user's review statistics. In order to perform these operations the client (artist or a music company) runs an application in order to set up communication between the client computer and the fans club server. By running an application for e.g. a web browser the client can login and perform upload to or download from the fans club server.

Flowchart 1001 of FIG. 10 is the process performed by the fans club server 105 of FIG. 1 during an interaction between a client (artist or a music company) and the fans club server for uploading the multimedia with music content and downloading the trial songs review statistics. After starting at 1003, at next block 1005 the fans club server establishes communication with the client computer 109 of FIG. 1. In order to establish communication the client runs an application from his/her client computer 109. At the next block 1007 when the application program is run on the client computer fans club server prompts for login and client will login. Subsequently the fans club server receives the configuration preferences that a client has set or has subscribed for availing particular type of service are received by the fans club server at the next block 1009. After receiving the configuration preferences at 1009, the fans club server prompts the client with various option buttons through which he/she can interact and perform the required task at the block 1011.

Next at the decision block 1013 the fans club server tests whether the selected option is uploading of multimedia content request. If it is true then the fans club server 105 of FIG. 1 prompts artist or the client in the browser window for uploading the multimedia content file at the block 1015. Next at the block 1017, it receives the client opened multimedia file and ends process at block 1025.

If the test fails the at decision block 1013, then the fans club server test whether the request is made for downloading review statistics at the decision block 1019. If it's found to be true the client or the artist will be presented with relevant spreadsheet files at the block 1021. The client will be prompted for the download with a download option button on the browser at the block 1023 to finish the downloading of the relevant spreadsheet to end the process at the block 1025. If the test fails at the decision block 1019 the fans club server goes to the last block 1025 to the end the operation.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A fan review system with a media distribution server, the fan review system comprising:
   a fans club server associated with at least an artist, wherein the fans club server comprises information about a plurality of fans;
   a plurality of mobile phones that can receive and display an interactive media based upon registration information managed by the fans club server, wherein the interactive media comprises at least one art product associated with the at least an artist, wherein the interactive media comprises multimedia content and a questionnaire used to solicit user feedback regarding the multimedia content, wherein user answers to the questionnaire are transmitted as a response of one of the plurality of mobile phones, and wherein the registration information comprises registration data registered by the plurality of fans with the fans club server;
   the media distribution server communicating the interactive media to the plurality of mobile phones and receiving responses back from the plurality of mobile phones; and
   the media distribution server communicating the responses to the fans club server.

2. The fan review system of claim 1, wherein the interactive media is communicated to the fan club server by the at least an artist from a computer communicatively coupled to the fan club server, wherein the computer is used to create the interactive media comprising at least one art product associated with the at least an artist.

3. The fan review system of claim 2, wherein the fans club server facilitates an online registration by a mobile phone user to become a fan so as to review and purchase the at least one art product created by the at least an artist.

4. The fan review system of claim 1, wherein the at least one art product comprises a plurality of songs yet to be released.

5. The fan review system of claim 1, wherein the fans club server facilitates review by a fan of the interactive media comprising a plurality of songs on one of the plurality of mobile phones and the purchase by the fan of a ringtone associated with at least one of the plurality of songs.

6. The fan review system of claim 1, wherein the at least one art product is a collection of digital music and videos provided as a prerelease preview by the at least one artist, wherein the collection comprises at least one item, and wherein the responses sent to the fans club server comprise feedback from at least one user of the plurality of mobile phones on the at least one item in the collection.

7. The fan review system of claim 1, wherein the fans club server facilitates registration of a user from at least one of the plurality of mobile phones to become a fan wherein the registration entitles the user to receive subsequent delivery of the interactive media.

8. A method performed by a server, the method comprising:
   receiving an interactive media comprising at least one item, wherein the item is one of a music piece, a video piece or an artwork piece;
   sending the interactive media to at least one registered fan from a collection of registered fans, wherein sending comprises finding target fans for the interactive media from a collection of registered fans, determining a phone number for each of the target fans, and communicating the interactive media to mobile phones associated with the phone number for each of the target fans;
   receiving responses to the interactive media by a user reviewing the interactive media on a mobile device associated with the at least one registered fan; and
   processing the responses to determine feedback by the at least one registered fan to the at least one item of the interactive media.

9. The method of claim 8, further comprising:
   uploading the interactive media from a client computer; and
   updating a database with the responses.

10. The method of claim 8, wherein processing comprises:
    determining a request from a fan for a purchase of a ringtone associated with one of the at least one item and facilitating the download of the ringtone.

11. The method of claim 8, wherein processing comprises:
    getting a request from a fan to locally save an image and delivering the image to a mobile device associated with the fan.

12. The method of claim 8, further comprising:
    inserting an advertisement into the interactive media based upon a registration information stored for the collection of registered fans.

13. The method of claim 8, further comprising:
    providing a report based on responses received, wherein the report highlights fan interest in the items of the interactive media.

14. The system of claim 1, wherein the multimedia content comprises newly created material of an artist.

15. The system of claim 14, wherein the newly created material comprises a song.

16. The system of claim 1, wherein the user feedback comprises a pre-order of a future release of material created by an artist.

17. The system of claim 16, wherein the future release is available for pre-order only to users registered with the fans club server.

18. A fan review system with a media distribution server, the fan review system comprising:
   a fans club server associated with at least an artist, wherein the fans club server comprises information about a plurality of fans;
   a plurality of mobile phones that can receive and display an interactive media based upon registration information managed by the fans club server, wherein the interactive media comprises at least one art product associated with the at least an artist, wherein the at least one art product is a collection of digital music and videos provided as a prerelease preview by the at least one artist, wherein the collection comprises at least one item, wherein the responses sent to the fans club server comprise feedback from at least one user of the plurality of mobile phones on the at least one item in the collection, and wherein the registration information comprises registration data registered by the plurality of fans with the fans club server;
   the media distribution server communicating the interactive media to the plurality of mobile phones and receiving responses back from the plurality of mobile phones; and
   the media distribution server communicating the responses to the fans club server.

19. The fan review system of claim 18, wherein the interactive media is communicated to the fan club server by the at least an artist from a computer communicatively coupled to the fan club server, wherein the computer is used to create the interactive media comprising at least one art product associated with the at least an artist.

20. The fan review system of claim 19, wherein the fans club server facilitates an online registration by a mobile phone user to become a fan so as to review and purchase the at least one art product created by the at least an artist.

21. The fan review system of claim 18, wherein the at least one art product is a plurality of songs yet to be released.

22. The fan review system of claim 18, wherein the fans club server facilitates review by a fan of the interactive media comprising a plurality of songs on one of the plurality of mobile phones and the purchase by the fan of a ringtone associated with at least one of the plurality of songs.

23. The fan review system of claim 18, wherein the fans club server facilitates registration of a user from at least one of the plurality of mobile phones to become a fan wherein the registration entitles the user to receive subsequent delivery of the interactive media.

24. The system of claim 18, wherein the multimedia content comprises newly created material of an artist.

25. The system of claim 24, wherein the newly created material comprises a song.

26. The system of claim 18, wherein the user feedback comprises a pre-order of a future release of material created by an artist.

27. The system of claim 26, wherein the future release is available for pre-order only to users registered with the fans club server.

* * * * *